United States Patent
Van der Walt et al.

(10) Patent No.: US 11,484,827 B2
(45) Date of Patent: Nov. 1, 2022

(54) CARBON DIOXIDE SEQUESTRATION IN NATURAL GAS PIPELINES

(71) Applicant: c/o NEXT Carbon Solutions, LLC, Houston, TX (US)

(72) Inventors: Ivan Van der Walt, Conroe, TX (US); Ben Heichelbech, Houston, TX (US); Vikrum Subra, Houston, TX (US); Connor Rivard, Houston, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/683,530

(22) Filed: Mar. 1, 2022

(65) Prior Publication Data

US 2022/0305433 A1  Sep. 29, 2022

Related U.S. Application Data

(60) Provisional application No. 63/165,471, filed on Mar. 24, 2021.

(51) Int. Cl.
  *B01D 35/147* (2006.01)
  *B01D 53/14* (2006.01)
(52) U.S. Cl.
  CPC .... *B01D 53/1475* (2013.01); *B01D 2252/102* (2013.01); *B01D 2252/204* (2013.01)
(58) Field of Classification Search
  None
  See application file for complete search history.

(56) References Cited

U.S. PATENT DOCUMENTS

| | | | | |
|---|---|---|---|---|
| 5,344,627 A | * | 9/1994 | Fujii | F25J 1/0052 423/220 |
| 6,632,266 B2 | * | 10/2003 | Thomas | B01D 53/226 95/49 |
| 9,149,761 B2 | * | 10/2015 | Northrop | C01B 17/0404 |
| 2009/0255181 A1 | * | 10/2009 | Rhinesmith | B01J 8/062 48/197 FM |
| 2010/0251763 A1 | * | 10/2010 | Audun | F25J 3/04533 62/614 |
| 2011/0014100 A1 | * | 1/2011 | Bara | B01D 53/62 423/437.1 |
| 2011/0148123 A1 | * | 6/2011 | De Doncker | B01D 53/1475 290/55 |
| 2012/0227441 A1 | * | 9/2012 | Mak | B01D 53/1425 62/617 |
| 2014/0137780 A1 | * | 5/2014 | Boulet | F23J 15/02 110/204 |
| 2015/0338098 A1 | * | 11/2015 | Boulet | B01D 53/047 95/98 |

* cited by examiner

*Primary Examiner* — Christopher P Jones
*Assistant Examiner* — Phillip Y Shao
(74) *Attorney, Agent, or Firm* — K&L Gates LLP

(57) ABSTRACT

Disclosed are processes, apparatuses, and systems that can be used in natural gas pipelines to significantly reduce the CO2 emissions of the natural gas pipelines, by capturing combusted flue gas which is normally wasted and putting it back to the pipelines, which can also be monetized (e.g., carbon credits). One example process may include producing a captured CO2 stream from a combustion gas of a gas turbine in a natural gas pipeline, compressing the captured CO2 stream, and combining the compressed CO2 stream with natural gas transported in the natural gas pipeline.

14 Claims, 2 Drawing Sheets

CARBON DIOXIDE SEQUESTRATION IN NATURAL GAS PIPELINES

CROSS-REFERENCE TO RELATED APPLICATION

This application claims priority from U.S. Provisional Application No. 63/165,471 filed on Mar. 24, 2021, the entirety of which is incorporated herein by reference.

BACKGROUND

A natural gas pipeline typically includes one or more pipelines and one or more compressor stations (or pumping stations) arranged to transport natural gas over long distances. About 27.7 trillion cubic feet of natural gas is transported across the continental United States every year through a network of about 3 million miles of pipelines, which link natural gas production areas (e.g., Wellheads), storage facilities, and consumers (e.g., liquefied natural gas (LNG) facilities, natural gas power plants, industrial facilities, residential units, etc.).

Most natural gas pipelines use gas turbines or engines ("prime movers") to drive compressors (driver(s)) to pump and/or regulate the pressure of the natural gas being transported inside the pipelines. Typically, a portion of the natural gas transported in a natural gas pipeline is combusted by each gas turbine as fuel for the gas turbine. Each pipeline typically uses multiple compressor stations geographically distributed along the pipeline (e.g., every 50 to 60 miles or so) to compensate for pressure losses due to, for example, friction of the natural gas moving inside pipes, differences in elevation of the pipes along the path of the pipeline, etc. Generally, the number and locations of compressor stations used in a particular natural gas pipeline may be selected depending on various factors such as geography along the path of the pipeline, desired amounts or flow rates of natural gas at any particular location along the pipeline, among other considerations.

Traditionally, combustion gas (or flue gas) generated at each prime mover in the compressor stations is typically released into the atmosphere, and may contain about 2-10% of carbon dioxide ($CO_2$) and/or other greenhouse gases. Greenhouse gases comprise various gaseous compounds including, carbon dioxide, methane, nitrous oxide, hydrofluorocarbons, perfluorocarbons, and sulfur hexafluoride, which may absorb radiation, trap heat in the atmosphere, and/or otherwise contribute to undesirable environmental greenhouse effects.

SUMMARY

According to one non-limiting aspect of the present disclosure, a process of carbon dioxide ($CO_2$) sequestration in a natural gas pipeline may comprise producing a $CO_2$ stream from a combustion gas of a prime mover in the natural gas pipeline, compressing the purified $CO_2$ stream, and sending the compressed purified $CO_2$ stream to at least one of the natural gas pipeline or a first sequestration site.

In one embodiment, the process may further comprise removing at least a portion of $CO_2$ from a gas in the natural gas pipeline to produce a gas stream. The at least a portion of $CO_2$ may be removed from the gas in the natural gas pipeline by an acid gas removal unit. The gas may include a combustion gas of the last gas turbine in the natural gas pipeline.

In one embodiment, the process may further comprise compressing the gas stream.

In one embodiment, the process may further comprise sending the compressed gas stream to the first sequestration site or to a second sequestration site different from the first sequestration site.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict specific example embodiments and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. Unless a term is expressly defined herein using the sentence "As used herein, the term '_____' is hereby defined to mean . . . " or a similar sentence, there is no intent to limit the meaning of that term beyond its plain or ordinary meaning. To the extent that any term is referred to in this patent in a manner consistent with a single meaning, that is done for sake of clarity only, and it is not intended that such claim term be limited to that single meaning. Finally, unless a claim element is defined by reciting the word "means" and a function without the recital of any structure, it is not intended that the scope of any claim element be interpreted based on the application of 35 U.S.C. § 112(f).

The present disclosure provides processes, apparatuses, and systems that can be used in natural gas pipelines to significantly reduce $CO_2$ emissions of the natural gas pipelines in an efficient manner. An example process disclosed herein involves capturing $CO_2$ from combustion gases (or flue gases) generated by a gas turbine (or other gas-powered engine) in the natural gas pipeline.

In an example, the captured CO2 may be sent back into the natural gas pipeline. In this example, the captured CO2 may be advantageously transported toward a carbon sequestration site or other carbon user location using existing pipeline infrastructure (i.e., the pipelines used to transport the natural gas) instead of or in addition to establishing dedicated pipeline infrastructure for transporting the captured CO2 independently. For instance, the captured CO2 may be removed from the pipeline at a different downstream location (e.g., closer to a sequestration site or carbon user). In alternative or additional examples, the captured CO2 may be sent to a carbon sequestration site or other carbon user separately from the natural gas in the pipeline (i.e., without first sending it back into the natural gas pipeline).

Thus, the processes, systems, and apparatuses of the present disclosure may facilitate reducing greenhouse gas emissions by natural gas pipelines. Furthermore, in some examples, the captured CO2 can also be monetized (e.g., as carbon credits) instead of being wasted as exhaust gas released into the atmosphere.

Figure 1:
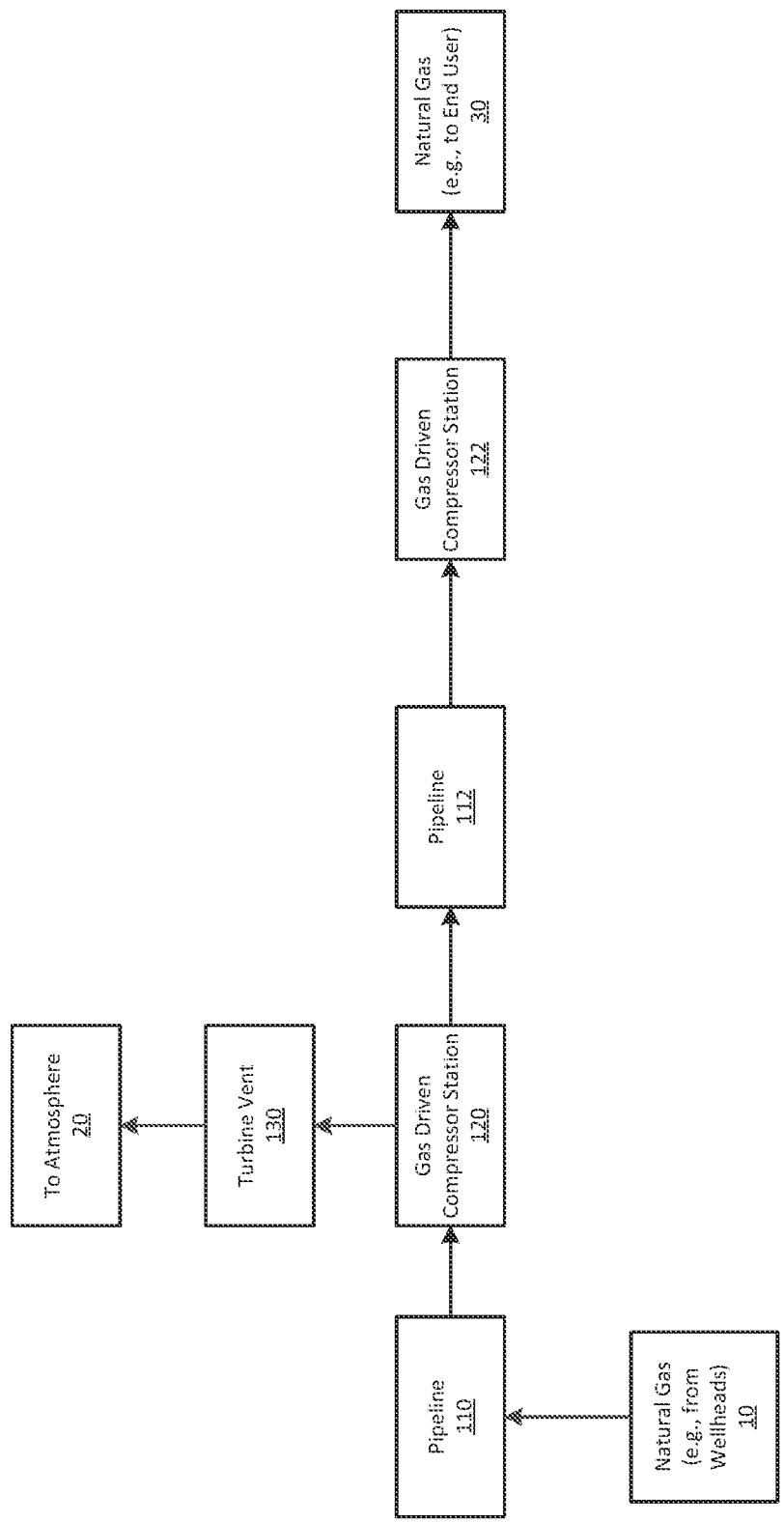
FIG. 1 is a schematic illustration of a traditional natural gas pipeline.

Referring now to the Figures, FIG. 1 is a schematic illustration of a traditional natural gas pipeline 100. The term "natural gas pipeline" may also be referred to herein as a "natural gas pipeline system," a "natural gas delivery system," or a "system." The natural gas pipeline 100 receives natural gas from one or more intake locations 10 (e.g., wellheads, storage facilities, etc.) and delivers the natural gas to one or more end user locations (e.g., LNG facilities, natural gas power plants, etc.).

To facilitate this, the natural gas pipeline 100 includes a network of one or more pipelines 110, 112 and gas driven compressor stations 120, 122, which are connected to define a path for the natural gas being transported inside the pipeline system 100 from the intake location(s) 10 to the end user location(s) 30.

Each of the pipelines 110, 112 generally includes at least one pipe but may optionally include a line of connected pipes, valves, switches, gates, and/or other types of fluid flow control devices that are arranged to convey a fluid (e.g., natural gas) flowing from one end of the pipeline to the other end of the pipeline. Further, the pipelines 110, 112 may include different types of pipelines, such as gathering pipelines (e.g., having a relatively small diameter), transmission pipelines (e.g., having a relatively larger diameter), and/or other types of pipelines.

The gas driven compressor stations 120, 122 may be positioned at different geographic locations along the path of the pipeline system 100 to regulate the flow of natural gas inside the natural gas pipeline 100. In general, the gases inside the pipeline 100 will flow from regions of high pressure to low pressure. Thus, for example, compressor station 120 may be operated to compress the steam of natural gas at a first end of pipeline 112 connected to the compressor station 120 so that it has a higher pressure than the pressure at a second end of the pipeline 112 (i.e., the second end connected to compressor station 122) thereby causing the natural gas (and/or other gases transported in the pipeline 112) to flow from the first end (i.e., away from the compressor station 120) to the second end (i.e., toward compressor station 122). More generally, the pipeline system 100 may include one or more compressor stations (exemplified by compressor stations 120 and 122) positioned at different locations along the pipeline 100 (e.g., every 50 to 60 miles or so) to regulate the pressures of the natural gas flowing inside the pipeline 100 at the locations of the compressor stations 120, 122. Prime movers in the compressor stations 120, 120 may combust a portion of the transported natural gas as fuel, and the combustion gases from these gas drivers are then released into the atmosphere 20 via turbine vents (exemplified by vent 130).

Unless otherwise specified herein, arrows depicted in the Figures of the present disclosure extending from or to various illustrated components may represent a fluid connection or conduit (e.g., piping, etc.) configured to transport a fluid (e.g., flue gas, natural gas, etc.) from or to component (s) at end(s) of the respective arrows. Further, an arrow direction of a respective arrow represents a flow direction (e.g., downstream direction) of the fluid flowing inside the conduit represented by the respective arrow. For example, the arrow illustrated in FIG. 1 between pipeline 110 and gas driven compressor station 120 represents a conduit (e.g., pipe(s), valve(s), etc.) which transports a fluid (natural gas) from the pipeline 110 to the compressor station 120, and so on.

Figure 2:
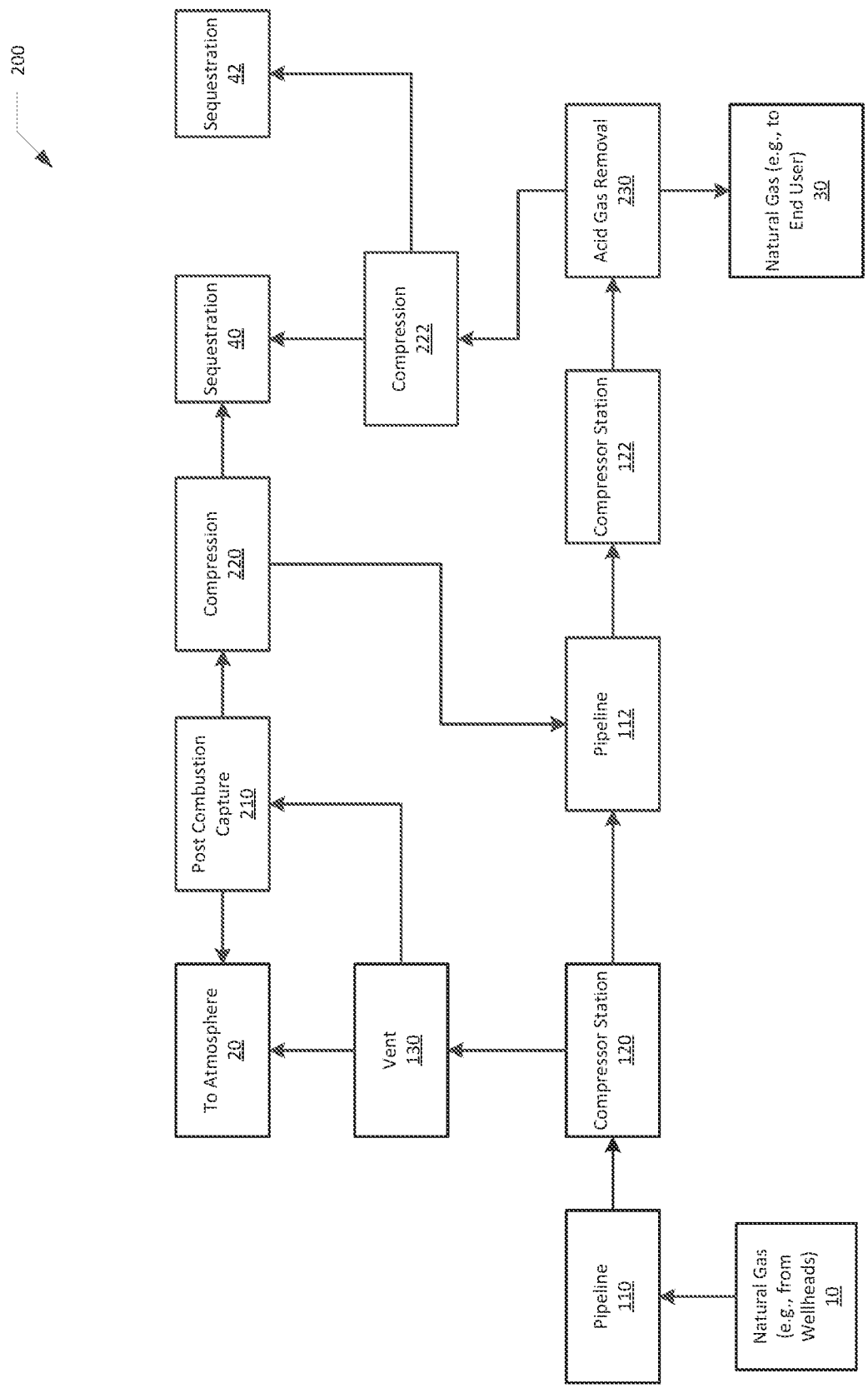
FIG. 2 is a schematic illustration of a natural gas pipeline that implements a process of carbon dioxide sequestration in the natural gas pipeline, in accordance with example embodiments of the present disclosure.

FIG. 2 is a schematic illustration of a natural gas pipeline 200 that implements a process of carbon dioxide (CO2) sequestration, in accordance with example embodiments of the present disclosure. Similarly to pipeline 100, the pipeline 200 includes one or more pipelines 110, 112 and one or more compressor stations 120, 122 arranged to transport natural gas from one or more intake locations 10 (e.g., wellheads, storage facilities, etc.) to one or more destinations 30 (e.g., end user locations, etc.).

In examples, the compressor stations 120 and/or 122 include a prime mover (e.g., gas turbine, gas-powered combustion engine, etc.) and a compressor driven by the prime mover and configured to compress (or pump) the natural gas flowing through the compressor station and back into the natural gas pipeline 200.

In an embodiment, the compressor station 120 comprises a prime mover that receives and combusts a portion of the natural gas transported in the natural gas pipeline 200 as fuel, so as to power at least one compressor (e.g., in the compressor station 120). The compressor station 120 may additionally or alternatively comprise at least one electrically-driven compressor, and the prime mover may drive an electric generator (e.g., in the compressor station 120) to provide electric power for powering the at least one electrically-driven compressor.

Thus, in some examples, the prime mover may comprise any type of combustion engine (e.g., piston engine, gas engine, gas turbine, etc.) that combusts fuel (e.g., natural gas or other fuel), received from the natural gas pipeline 200 or from a different source (e.g., local fuel storage, other fuel source, etc.), to drive at least one compressor in the compressor station 120 (and/or to drive a generator that provides electric power to the at least one compressor).

Regardless of the prime mover implementation used to operate the compressor(s) in the compressor stations 120 and 122, in examples, the prime mover (e.g., gas turbine, etc.) of the compressor station 120 may generate a combustion gas (e.g., flue gas) which is transported out of the compressor station 120 through vent 130. More generally, the vent 130 may be used transport combustion gases generated by any component in the compressor station 120. For example, the compressor station 120 may include other natural gas processing components that rely on combustion (e.g., filtration systems, fired heaters, etc.) which generate combustion gases or flue gases which are vented out of the compressor station 120 via the vent 130.

The natural gas pipeline 200 may also include a Post Combustion Capture unit ("PCCU") 210 arranged to receive at least a portion of the combustion gas (e.g., generated by gas turbines, etc.) from the vent 130. For example, at least a portion of the combustion or flue gas from the vent 130 may be directed to the PCCU 210 via piping and/or other type of fluid connection. In some examples, the system 200 may also include one or more booster fans (not shown) configured to receive the flue gas stream from the vent 130 and to convey the flue gas stream towards the PCCU 210. In examples, the PCCU 120 uses the received flue or combustion gas to produce a purified stream of CO2 or, more generally, a gas stream enriched with CO2 captured from the combustion gas (or flue gas) received from the vent 130. Thus, for example, the PCCU 210 may generate a carbon dioxide rich stream from combustion products generated by a gas turbine (or other combustion engine) of the compressor station 120.

In some examples, the PCCU 210 may use an amine process to absorb carbon dioxide from the flue gas stream. It should be appreciated that different types of amine are possible depending on the relative concentrations of carbon dioxide in the flue gas stream. For example, some natural gas fired turbines produce flue gas that has approximately 2-10% CO2 while other types of gas-powered engines may produce a flue gas having a different concentration of CO2. Thus, in an example, the PCCU 210 may use different anime mixtures to absorb CO2 from the flue gas depending on the actual or expected CO2 content of the flue gas. Other CO2 capture processes can additionally or alternatively be used by the PCCU 210, such as processes that use ammonia, carbonates, or other related materials. For example, the PCCU 210 may implement a chilled ammonia process for absorbing CO2, where heat is applied for regenerating ammonia absorbent.

In some examples, approximately 85%-95% of CO2 can be reclaimed by the PCCU 210 from the flue gas received from the vent 130. The reclaimed CO2 (e.g., as a purified CO2 stream or as an unpurified gas stream) may then be sent to a compression unit 220. In some examples, unclaimed CO2 and other constituents of the flue gas may be sent out of the PCCU 210 to the atmosphere 20.

The compression units 220, 222 may include any type of gas compressor (e.g., centrifugal compressor, etc.) configured to compress an input gas stream and output a compressed (e.g., higher pressure) gas stream. For example, as shown, compression unit 220 may receive a first gas stream (e.g., purified CO2 stream, etc.) from the PCCU 210 and output a compressed gas stream (e.g., compressed CO2 stream, etc.). The compressed gas stream output from the compression unit 220 is sent to at least one of the pipeline 200 and/or the sequestration site 40.

In an example, at least a portion of the compressed gas stream from the compression unit 220 is sent to the pipeline 112 so as to combine the compressed gas stream (which is enriched with CO2 captured from the combustion gas from the gas turbine or other component in the compressor station 120) with the natural gas being transported downstream (e.g., to the compressor station 122) via the pipeline 112. With this arrangement, the system 200 may advantageously use the existing pipeline infrastructure (e.g., pipeline 112) used to transport natural gas to also transport the captured (and compressed) CO2 stream to a different downstream location which may be, for example, a location that is closer to carbon sequestration site (e.g., sequestration site 42, etc.) or other carbon user than the location of the compressor station 120. More generally, this arrangement may have the advantage of being able to transport CO2 without needing to build a potentially significant amount of dedicated CO2 pipeline infrastructure.

Alternatively or additionally, in an example, at least a portion of the compressed gas stream output by the compression unit 120 (which includes CO2 captured from the combustion gases vented out of the compressor station 120) may be sent to a sequestration site 40 (e.g., for permanent underground storage, etc.). By sending the carbon dioxide rich stream to some form of sequestration (e.g., sequestration site 40 and/or 42), overall greenhouse gas emissions from the natural gas pipeline are reduced. Other forms of sequestration (not shown in FIG. 1) may be implemented, including for example sending the CO2 rich gas to an on-site or off-site storage tank, to a tank mounted on a rail car, or a tank mounted on a truck-drawn trailer. In some examples, after compression, the sequestered CO2 rich gas may advantageously be sold for a number of well-known applications and uses.

In an embodiment, sequestration site 40 and/or 42 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site 40 and/or 42 is a region on top of a seabed, at a depth greater than three kilometers below sea level. In yet another example, the sequestration site 40 and/or 42 is a region below a seabed. In yet another example, the sequestration site 40 and/or 42 is a region below a seabed, such as, for example, a seabed located at a depth greater than about 3.0 kilometers below sea level.

In some examples, a process of the system 200 may involve deciding whether to send at least a portion of the compressed CO2 stream (output from the compression unit 220) (i) back to the pipeline (e.g., into pipeline 112) and/or (ii) to the sequestration site 40 based on whether adding the additional CO2 back into the pipeline would put the pipeline off tariff.

Next, in the illustrated example, the pipeline 112 may transport gases (e.g., including natural gas from the compressor station 120, and/or the compressed gas stream (or CO2 enriched compressed stream) from the compression unit 220) to the compressor station 122.

The compressor station 122 may similarly include a gas turbine (and/or other type of combustion engine) configured to drive at least one compressor in the compressor station 122, and may therefore similarly generate a second combustion gas. To that end, although not shown, the system 200 may include additional components (e.g., PCCU(s), compressor(s), etc.) to process the second combustion gas vented from the compressor station 122 (e.g., gas turbine flue gas, etc.), send the second combustion gas (or CO2 extracted therefrom) to a sequestration site (e.g., 40, 42, etc.), and/or back into the pipeline 200 (e.g., for combination with the natural gas being delivered to a downstream location such as the location of acid gas removal unit 230, etc.), in line with the discussion above. In a specific example, compressor station 122 includes a gas turbine (or other gas-powered engine) that receives and combusts a portion of the natural gas from the pipeline 112 to drive at least one compressor in the compressor station 122 (and, as a by-product, generate a second combustion gas).

In an example, compressor station 122 may be a last compressor station prior to outflow of at least a portion of the natural gas to an end user location 30. For example, the compressor station 122 may include a final gas turbine or other combustion gas emitting component along the path of the natural gas transported to the end user location 30. In this example, after the final Gas Turbine Compressor Station 122 combusts a portion of the natural gas from the natural gas pipeline 112, and before outputting at least a portion of the natural gas to the end-user location 30, the system 200 may include an Acid Gas Removal Unit (7) configured to receive the gases from the pipeline (e.g., the gases flowing out of the final compressor station 122) and to remove CO2 from the gases (e.g., including CO2 captured from flue gases produced by one or more Gas Turbine Compressor Station that was injected back into the pipeline upstream of the acid gas removal unit 230), according to the requirement of the end-user. In alternative or additional examples, the acid gas removal unit 230 may be disposed at a different location (which may not necessarily be after the final compressor station 122) along the path of the natural gas transported to the end user location 30.

The Acid Gas Removal Unit 230 may implemented according to any type of acid gas removal technology. In an example, the acid gas removal unit 230 is configured to remove up to 99% of the CO2 in flue gas produced by a final gas turbine (or other combustion engine) in the final Compressor Station 122 (and/or CO2 from other flue gases injected into the pipeline at an upstream compressor station such as station 120, etc.). In a specific example, the CO2 content of an output natural gas stream transmitted out of the acid gas removal unit 230 (e.g., as an output of the pipeline 200 at the end user location 30) may be approximately 1% or lower. However, other amounts and/or tolerances for the CO2 content output at the end user location 30 are possible depending on specific applications of the natural gas pipeline 200. In an example, the Acid Gas Removal Unit 230 may be integrated in the pipeline 200. In additional or alternative examples, the acid gas removal unit 230 may be implemented as a separate processing plant.

More generally, in some examples, acid gas removal unit 230 may be configured to accept natural gas at or near an output location 30 of the pipeline 200 (i.e., after flue gases from a final compressor station 120 are injected into the pipeline, etc.), and generates one or more of an acid gas stream, a flash gas stream, and/or a purified natural gas stream. In a specific example, acid gas removal unit 230 advantageously processes the natural gas to remove various contaminants, such as mercury, hydrogen-sulfide, carbon dioxide, and the like. In a particular embodiment, as noted above, the acid gas removal unit 230 also treats incoming natural gas, in order to remove carbon dioxide from the natural gas stream. For example, acid gas removal unit 230 may implement an amine process, which absorbs the carbon dioxide in an amine absorber. In an embodiment, acid gas removal unit 230 includes an amine absorber and liquid amine absorbent for absorbing carbon dioxide. The amine is then heated (e.g., regenerated), to return to the absorber. The carbon dioxide rich stream (also referred to generally as an acid gas stream) may then be separated and sent directly to compression unit 22. In an embodiment, acid gas removal unit 230 may include a chilled ammonia process for absorbing CO2, wherein excess steam is directable to acid gas removal to provide heat for regenerating ammonia absorbent. Advantageously, this acid gas stream is not sent to a thermal oxidizer; thus, the acid gas stream need not be combusted and released into the atmosphere via any thermal oxidation process. Other acid gas removal processes may alternatively or additionally be performed, depending on various applications of the system 200 and/or requirements of an end user 30.

As noted above, after removal of CO2 from the pipeline 200 by the Acid Gas Removal Unit 230, the acid gas removal unit 230 may output the captured CO2 as a CO2 enriched gas stream, which may then be sent to another compression unit 222 (e.g., similar to the compression unit 220). The compression unit 222 may then compress and output the CO2 enriched gas stream on to a sequestration site. In an example, the compressed gas stream from the compression unit 222 may be sent to the same sequestration site 40 (i.e., to which CO2 captured from flue gases of the first compressor station 120 were previously sent upstream). In additional or alternative examples, the compressed gas stream from the compression unit 222 may be sent to a different sequestration site 42. For example, the second sequestration site 42 may be a different type of sequestration site (e.g., seabed, underground storage, etc.) and/or may be physically located at a different location (e.g., up to 10s, 100s, or 1000s of miles away from the first sequestration site 40, etc.).

More generally, in some examples, one or more of the sequestration site 40, the sequestration site 42, the compressor station 120, and/or the compressor station 122 may be separated by many miles from the other sequestration sites and/or compressor stations.

It is noted that the natural gas pipeline 200 may include fewer or more components than those shown. For example, although not shown, the compressor station 122 may be coupled to one or more of a vent, a PCCU, etc., similarly to the compressor station 120. As another example, the system 200 may include fewer or more pipelines 110, 112, and/or compressor stations 120, 122. Further, the functions described above for one or more blocks in FIG. 2 may be physically implemented by a single component. For example, the vent 130 can be physically implemented as a component of the compressor station 120.

In line with the discussion above, a non-limiting example process for carbon dioxide (CO2) sequestration in the natural gas pipeline 200 disclosed herein comprises producing a least one captured CO2 rich stream from combustion gases of at least one prime mover of the natural gas pipeline 200. For example, the PCCU 210 may produce a captured CO2 rich stream from a combustion gas of a prime mover (e.g., gas turbine, gas engine, etc.) in the compressor station 120. Similarly, the PCCU 210 and/or other PCCUs (not shown) in the natural gas pipeline 200 may produce one or more other CO2 rich streams from combustion gases of one or more other prime movers (e.g., a prime mover of the compressor station 122, etc.). The example process also comprises compressing the at least one captured CO2 rich stream (e.g., at compressor 220 and/or at other compressor (s) in the pipeline 200). The example process also comprises combining the compressed at least one captured CO2 rich stream with natural gas transported in the natural gas pipeline 200. For example, a compressed CO2 stream produced at compressor 220 may be combined with the natural gas at pipeline 112 so that it can be transported downstream (e.g., toward compressor station 122) with the natural gas. Other captured CO2 stream(s) may be similarly combined at different locations and/or at other pipelines in the natural gas pipeline system 200.

In some implementations, the example process may also comprise removing at least a portion of CO2 flowing in the natural gas pipeline 200 downstream of the combining to produce a removed CO2 stream. Referring to FIG. 2 for example, the removed CO2 stream may be produced by the acid gas removal unit 230, which is downstream of pipeline 112 (at which captured CO2 was combined with the natural gas flowing in the natural gas pipeline 200). The removed CO2 stream may be transported separately from the natural gas flowing in the natural gas pipeline 200. For example, a removed CO2 stream may be transported from the acid gas removal unit 230 to the compressor 22 separately from the natural gas flowing from the acid gas removal unit 230 to the end user location 30.

In some implementations, at least a portion of the at least one captured $CO_2$ stream (e.g., compressed at compressor 220) may be sent to a captured $CO_2$ sequestration site (e.g., site 40). Further, in some implementations, at least a portion of the removed $CO_2$ stream (e.g., compressed at compressor 222) may be sent to the same captured $CO_2$ sequestration site (e.g., site 40) or to a different removed $CO_2$ sequestration site (e.g., site 42).

The disclosed processes, apparatuses, and systems can be used in any natural gas pipeline. For example, the disclosed processes, apparatuses, and systems can be used in the natural gas pipeline(s) of a liquefied natural gas facility or a natural gas power plant to maximize the sequestration of $CO_2$ of the facility or plant.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

What is claimed is:

1. A process for carbon dioxide ($CO_2$) sequestration in a natural gas pipeline, the process comprising:
    producing a least one captured $CO_2$ rich stream from combustion gases of at least one prime mover of the natural gas pipeline;
    compressing the at least one captured $CO_2$ rich stream; and
    combining the compressed at least one captured $CO_2$ rich stream with natural gas transported in the natural gas pipeline.

2. The process of claim 1 further comprising:
    producing a removed $CO_2$ rich stream by removing at least a portion of $CO_2$ flowing in the natural gas pipeline; and
    transporting the removed $CO_2$ rich stream separately from the natural gas flowing in the natural gas pipeline.

3. The process of claim 2, wherein the removed $CO_2$ rich stream is produced by an acid gas removal unit.

4. The process of claim 2, wherein the producing of the removed $CO_2$ rich stream occurs downstream of the combining of the at least one captured $CO_2$ rich stream and the natural gas transported in the natural gas pipeline.

5. The process of claim 2, further comprising compressing the removed $CO_2$ rich stream.

6. The process of claim 5, further comprising sending the compressed removed $CO_2$ rich stream to a removed $CO_2$ sequestration site.

7. The process of claim 1, further comprising sending at least a portion of the at least one captured $CO_2$ rich stream to a captured $CO_2$ sequestration site.

8. The process of claim 5, further comprising sending at least a portion of the removed $CO_2$ rich stream and at least a portion of the at least one captured $CO_2$ rich stream to a captured $CO_2$ sequestration site.

9. A process for carbon dioxide ($CO_2$) sequestration in a natural gas pipeline, the process comprising:
    producing a least one captured $CO_2$ rich stream from combustion gases of at least one prime mover of the natural gas pipeline;
    compressing the at least one captured $CO_2$ rich stream;
    combining the compressed at least one captured $CO_2$ rich stream with natural gas transported in the natural gas pipeline,
    producing a removed $CO_2$ rich stream by removing at least a portion of $CO_2$ flowing in the natural gas pipeline downstream of the combining of the compressed at least one captured $CO_2$ rich stream with the natural gas in the natural gas pipeline; and
    transporting the removed $CO_2$ rich stream separately from the natural gas flowing in the natural gas pipeline.

10. The process of claim 9, wherein the removed $CO_2$ rich stream is produced by an acid gas removal unit.

11. The process of claim 10, further comprising compressing the removed $CO_2$ rich stream.

12. The process of claim 11, further comprising sending the compressed removed $CO_2$ rich stream to a removed $CO_2$ sequestration site.

13. The process of claim 9, further comprising sending at least a portion of the at least one captured $CO_2$ rich stream to a captured $CO_2$ sequestration site.

14. The process of claim 13, further comprising sending at least a portion of the removed $CO_2$ rich stream to the captured $CO_2$ sequestration site.

* * * * *